United States Patent
Reichert

(10) Patent No.: US 12,508,932 B1
(45) Date of Patent: Dec. 30, 2025

(54) BUILDING/FACILITY POWER COOL HEAT AND ELECTRIC VEHICLE FAST CHARGING SYSTEM

(71) Applicant: Thomas G. Reichert, Escondido, CA (US)

(72) Inventor: Thomas G. Reichert, Escondido, CA (US)

( * ) Notice: Subject to any disclaimer, the term of this patent is extended or adjusted under 35 U.S.C. 154(b) by 0 days.

(21) Appl. No.: 19/063,601

(22) Filed: Feb. 26, 2025

Related U.S. Application Data

(60) Provisional application No. 63/561,646, filed on Mar. 5, 2024.

(51) Int. Cl.

| | |
|---|---|
| *B60L 53/57* | (2019.01) |
| *B60L 53/30* | (2019.01) |
| *B60L 53/67* | (2019.01) |
| *C09K 5/04* | (2006.01) |
| *F24D 18/00* | (2022.01) |
| *G08B 26/00* | (2006.01) |
| *H02J 3/38* | (2006.01) |
| *H02J 13/00* | (2006.01) |

(52) U.S. Cl.
CPC ............... *B60L 53/57* (2019.02); *B60L 53/30* (2019.02); *B60L 53/67* (2019.02); *C09K 5/047* (2013.01); *F24D 18/00* (2022.01); *H02J 3/38* (2013.01); *H02J 13/00002* (2020.01); *G08B 26/00* (2013.01); *H02J 2300/10* (2020.01); *H02J 2310/12* (2020.01)

(58) Field of Classification Search
CPC .......... B60L 53/57; B60L 53/67; B60L 53/30; H02J 13/00002; H02J 3/38; H02J 2300/10; H02J 2310/12; F24D 18/00; C09K 5/047; G08B 26/00
See application file for complete search history.

(56) References Cited

U.S. PATENT DOCUMENTS

| | | | |
|---|---|---|---|
| 10,845,102 B2 * | 11/2020 | Ibrahim | F25B 30/04 |
| 11,451,059 B2 * | 9/2022 | Cavness | G06Q 20/145 |
| 2011/0030404 A1 * | 2/2011 | Gurin | F25B 27/002 |
| | | | 62/235.1 |
| 2017/0252470 A1 * | 9/2017 | Aniol | F23G 5/46 |
| 2020/0051184 A1 * | 2/2020 | Barbour | E21B 41/00 |

* cited by examiner

*Primary Examiner* — Carlos Amaya
(74) *Attorney, Agent, or Firm* — Gugliotta & Gugliotta LPA

(57) ABSTRACT

A modular utility system integrates clean power generation, thermal management, and security monitoring within a standardized shipping container format. The system comprises a generator set (70 kW-600 kW) configured for operation with multiple fuel sources including natural gas, propane, methane, or hydrogen, coupled to a water-fired absorption chiller utilizing waste heat recovery. A closed-circuit evaporative cooler enhances thermal efficiency without chemical additives. The system incorporates a 360-degree security camera and remote monitoring capabilities for tracking operational parameters. A power distribution panel (460V, 3-phase) supports both building power supply and electric vehicle charging stations. The modular architecture enables scalable deployment through dual-module configurations, with separate power generation and thermal management units. The system provides sustainable, off-grid power generation while maximizing energy efficiency through integrated waste heat utilization and advanced thermal management protocols.

18 Claims, 1 Drawing Sheet

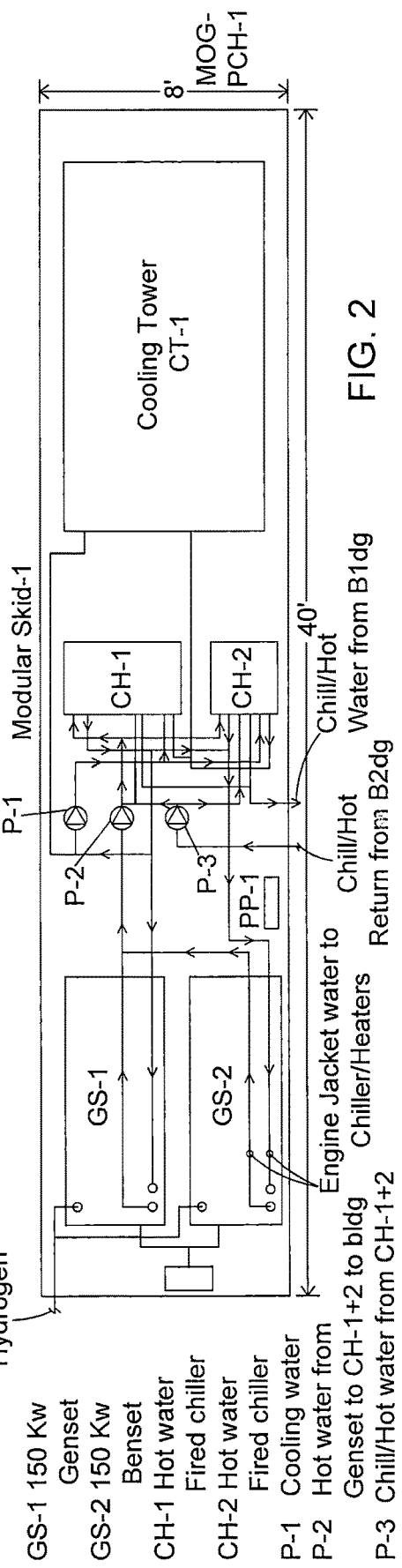
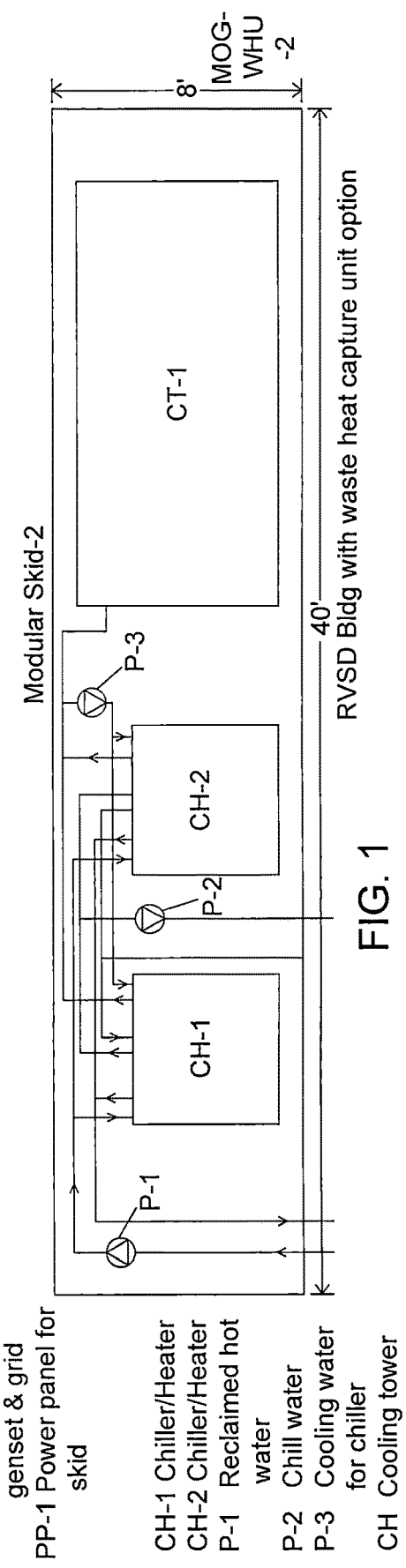

BUILDING/FACILITY POWER COOL HEAT AND ELECTRIC VEHICLE FAST CHARGING SYSTEM

RELATED APPLICATIONS

The present invention claims benefit of U.S. Provisional Application Ser. No. 63/561,646, filed on Mar. 5, 2024 and incorporated by reference as if fully rewritten herein.

BACKGROUND OF THE INVENTION

1. Field of the Invention

The present invention relates generally to the field of facility power generation and electric vehicle (EV) charging systems and, more specifically, the invention pertains to a modular, off-grid power system that integrates high-capacity clean energy generation, advanced thermal management, and real-time security monitoring within a single, scalable infrastructure.

2. Description of the Related Art

Existing electric vehicle (EV) charging infrastructure and facility power generation systems typically operate within separate domains, addressing either energy production, thermal management, or security monitoring in isolation. Most conventional EV charging solutions rely on grid-supplied electricity, limiting their viability in off-grid or remote locations with insufficient power infrastructure. When renewable energy sources are incorporated, they often lack efficient thermal management strategies, resulting in wasted heat energy and suboptimal system performance.

Traditional facility power systems exhibit similar inefficiencies, particularly in the conversion and utilization of waste heat. Many power generation units produce excess thermal energy that is either vented or dissipated, rather than recovered and repurposed for additional applications such as facility heating or cooling. Existing HVAC systems used for thermal regulation often rely on refrigerants with high Global Warming Potential (GWP) and Ozone Depletion Potential (ODP), posing significant environmental risks. Furthermore, the lack of integration between power, cooling, and monitoring subsystems results in disjointed operations, requiring separate control systems and increasing maintenance complexity.

Security and remote monitoring capabilities are often an afterthought in existing EV charging and power generation systems, with many installations relying on standalone security cameras that operate independently of the system's core infrastructure. This separation creates vulnerabilities in real-time tracking, fault detection, and operational oversight, particularly for off-grid or unattended installations.

The absence of a unified, modular approach has resulted in systems that are fragmented, inefficient, and environmentally unsustainable. A need exists for a fully integrated, scalable solution that combines clean energy generation, advanced waste heat recovery, high-efficiency thermal management, and real-time remote monitoring into a single, modular platform. Such a system would enhance energy efficiency, reduce environmental impact, and provide robust operational security, ensuring viability for off-grid EV charging, facility power management, and scalable deployment in various applications.

SUMMARY OF THE INVENTION

It is an object of the present invention to provide an integrated approach to combining clean energy generation with advanced thermal management and enhanced security features, specifically designed for off-grid applications.

The system incorporates a flexible energy source in the form of a modular generator set (Genset), capable of operating on natural gas, propane, methane, or hydrogen, and a waste heat recovery subsystem featuring a water-fired absorption chiller and a closed-circuit evaporative cooler. This combination optimizes thermal efficiency, reduces environmental impact, and eliminates the need for conventional refrigerants. In addition to delivering power to EV fast charging stations and facility electrical loads, the system enhances energy utilization through a closed-loop heat exchange mechanism, enabling efficient heating and cooling applications. The modular architecture supports scalable deployment, with configurations ranging from single-skid units to dual-module systems for higher power demands. Furthermore, the system integrates automated remote monitoring, real-time operational tracking, and security surveillance via a 360-degree camera, providing a comprehensive, self-sustaining power and EV charging solution for remote, off-grid, or grid-supported installations.

Feature of the present invention address these challenges by integrating clean energy generation, advanced thermal management, and enhanced security features into a single, modular system designed for off-grid building power and EV charging applications. This solution presents several advancements over the prior art:

Flexible and Sustainable Energy Source: By utilizing a variety of clean fuels—natural gas, propane, methane, or hydrogen—the system reduces dependency on grid electricity and minimizes environmental impact, offering a sustainable alternative for building power and EV charging.

Efficient Thermal Management: The innovative use of a water-fired absorption chiller to recycle waste heat from the generator for heating or cooling purposes eliminates the need for environmentally harmful refrigerants, enhancing the system's sustainability.

Optimized Waste Heat Recovery: The integration of a closed-circuit evaporative cooler with the absorption chiller maximizes the efficiency of waste heat utilization, contributing to the overall energy efficiency of the system.

Integrated Electrical, Mechanical, Thermal and Security Monitoring: Incorporating a 360-degree security camera enables comprehensive, remote monitoring of the charging station, ensuring operational security and enhancing user confidence.

High-Capacity Fast Charging: The system's capability to support high-capacity fast charging (e.g., 600 kW Genset powering multiple charging stations) addresses the growing demand for rapid EV charging in off-grid and remote locations.

Modular Design and Scalability: The system's modular design allows for flexible installation and scalability, enabling developers to add power generation capacity as needed, aligning with building occupancy and energy demand.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a schematic for a modular off grid power cooling and heat module according to an exemplary embodiment of the present invention; and FIG. 2 is a schematic for a modular waste heat unit for use with units over 300 kW.

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The best mode for carrying out the invention is presented in terms of its preferred embodiment, herein depicted within the Figures.

1. Detailed Description of the Figures

Referring now to the drawings, where like reference numerals indicate the same parts throughout the several views, illustrate an integrated, modular system designed for off-grid electric vehicle (EV) fast charging and facility power management. This system incorporates multiple subsystems that operate synergistically to provide power generation, waste heat recovery, thermal management, and security monitoring.

The modular system comprises two primary units: a power generation module (Module-1) and a heat recovery module (Module-2). Module-1 includes the primary generator set (Genset), power distribution components, and base control systems necessary for stable and efficient operation. Module-2 incorporates a water-fired absorption chiller, closed-circuit evaporative cooler, cooling towers, circulation pumps, and thermal management controls to enhance waste heat utilization and system efficiency.

The EV fast charging stations are positioned adjacent to the power generation module and receive power directly from the distribution panel. The system's design ensures seamless integration between the power generation, heat recovery, and charging infrastructure. Piping and wiring layouts establish clear connections between the Genset, heat recovery module, and charging stations, while airflow and ventilation ducts regulate thermal conditions within the system, optimizing cooling efficiency. To enhance security and operational oversight, a strategically placed 360-degree security camera provides full system coverage, enabling remote monitoring and automated tracking of critical operational parameters.

The system's primary power source is a high-capacity generator set (Genset), which is modular in nature, allowing for scalable configurations ranging from 70 kW to 600 kW. This modularity provides the flexibility to expand the system as energy demand increases. The Genset is powered by various clean energy sources, including natural gas, propane, methane, or hydrogen, allowing for site-specific fuel selection and sustainability goals.

The Genset is sourced from manufacturers such as Cummins, Caterpillar, Tedom, Kohler, or 2G, ensuring reliability and performance consistency. The Genset operates within a weatherproof, pre-engineered enclosure, designed for outdoor installation in both urban and remote locations. It interfaces with a 230-volt or 460-volt, three-phase power distribution panel, enabling direct energy delivery to EV charging stations or facility power infrastructure.

A critical feature of the present invention is its waste heat utilization strategy, which enhances overall energy efficiency. During operation, the Genset generates significant waste heat, particularly from its jacket water system. Instead of dissipating this thermal energy into the environment, the present system captures and redirects it for secondary applications, such as cooling or heating.

The present invention incorporates an advanced thermal management system, which includes a water-fired absorption chiller, a closed-circuit evaporative cooler, and an integrated circulation pump network to harness and repurpose waste heat generated by the Genset.

The water-fired absorption chiller utilizes Yazaki chiller/heater units, which operate using a lithium-bromide (Li—Br) and water ($H_2O$) solution, eliminating the need for traditional refrigerants such as CFCs and HFCs that contribute to global warming and ozone depletion. The absorption chiller (2) is directly connected to the Genset, enabling it to capture waste heat from the engine jacket water and convert it into usable energy for cooling or heating applications.

To further optimize system efficiency, the closed-circuit evaporative cooler (3) plays a critical role in supporting the absorption chiller. The evaporative cooler enhances the cooling process by circulating water through a closed-loop system, ensuring that optimal thermal regulation is maintained under varying load conditions. The system eliminates the need for traditional chemical-based water treatments, ensuring that the cooling process remains environmentally safe and efficient.

A unique feature of the closed-circuit evaporative cooler is its ability to treat wastewater without chemical additives, thereby preventing contamination and enabling potential reuse as potable water. This feature enhances the system's sustainability by reducing waste and minimizing environmental impact. The circulating pump network, sourced from Armstrong, Grundfos, or Peerless, ensures continuous fluid movement between the evaporative cooler, absorption chiller, and thermal management controls. This network maximizes cooling efficiency, reduces operational costs, and improves overall system performance. By leveraging waste heat recovery and an efficient evaporative cooling cycle, the system delivers an advanced and environmentally sustainable approach to thermal energy management.

The system incorporates a power distribution panel, which efficiently allocates generated energy to multiple EV fast charging stations. The power distribution architecture supports up to four 160 kW fast-charging stations simultaneously, delivering power through an integrated AC/DC conversion system. The primary 460-volt, three-phase AC power from the generator is processed through high-efficiency power conversion modules, which transform the AC power into the DC output required for EV charging. These power conversion units are designed to deliver precise DC voltage control and can be adjusted to accommodate various EV charging standards and power requirements. The conversion system maintains stable DC output across multiple charging sessions, ensuring consistent and reliable fast charging performance, particularly in remote or off-grid environments where conventional grid infrastructure is unavailable or unreliable.

The modular nature of the power system allows for future expansion, enabling operators to increase the number of EV charging stations based on demand. The power conversion infrastructure is similarly modular, with separate AC/DC conversion units dedicated to each charging station, ensuring optimal power quality and charging efficiency. Additionally, the system includes built-in load management capabilities, which dynamically adjust power distribution and conversion parameters to optimize charging efficiency across multiple stations. This intelligent power management system monitors both the AC power generation and DC power delivery, maintaining optimal charging performance while preventing system overload.

A security and remote monitoring subsystem ensures continuous oversight and operational integrity. The system integrates a 360-degree security camera, providing real-time monitoring and surveillance. This camera is designed for motion activation and supports remote viewing, enabling operators to oversee the system's operation from any location.

The remote monitoring system tracks various operational parameters, including fuel consumption, power generation efficiency, fault detection, and maintenance scheduling. Automated alerts notify operators of any system irregularities, allowing for immediate response and corrective action. This intelligent monitoring system enhances operational reliability, minimizing downtime and maintenance costs while ensuring consistent performance. Scalability and Deployment

2. Operation of the Preferred Embodiment

The operation of the present invention, as outlined in the above detailed description, demonstrates how each component contributes to the system's functionality. The modular and pre-engineered design of the present invention enables rapid deployment across various applications. The system is designed for transportation and installation within a standard 40-foot intermodal storage container, allowing for easy deployment in off-grid locations, commercial charging hubs, and energy-resilient facilities. The base system is capable of producing up to 400 kW of power, with an expandable architecture that allows additional modules to be integrated as needed.

For applications requiring greater capacity, a dual-module configuration is available, wherein Module-1 houses power generation components and Module-2 manages waste heat recovery. Both modules are enclosed in weatherproof, powder-coated steel frames, ensuring durability and resistance to environmental conditions.

Overall, the present invention delivers an advanced, scalable, and environmentally sustainable EV charging and facility power solution, integrating clean energy generation, waste heat recovery, and real-time security monitoring. This system provides an efficient and future-ready alternative to conventional EV charging infrastructure, addressing the growing demand for off-grid, high-capacity energy solutions while maintaining a strong focus on environmental sustainability and energy efficiency.

The system's modular configuration enables scalable deployment, with standard modules rated at 400 kW and the capability to combine multiple modules for increased capacity. The weatherproof design allows for outdoor installation, requiring only connection to the selected fuel source, which may include natural gas (NG), propane ($C_3H_8$), methane ($CH_4$), or hydrogen ($H_2$).

The present invention's modular architecture facilitates rapid deployment through a standardized 40-foot intermodal container format. This design approach enables: installation of individual 400 kW modules; implementation of dual-module configurations for enhanced capacity; flexible scaling through the addition or removal of modules based on demand; and future fuel source conversion capability, particularly for transition to hydrogen fuel systems.

The system's generator set (Genset) demonstrates fuel source flexibility, supporting operation on natural gas, propane, methane, or hydrogen. This adaptability enables: initial deployment with conventional fuel sources; future transition to alternative fuels through engine modification; retention of existing thermal management components during fuel source conversion; and environmental impact reduction through clean fuel utilization.

The water-fired absorption chiller implementation represents an advancement in thermal efficiency through: utilization of Genset jacket water for thermal transfer; elimination of conventional refrigerants (CFCs/HFCs); integration with the closed-circuit evaporative cooler; and provision of both heating and cooling capabilities.

The closed-circuit evaporative cooler enhances system efficiency through: optimized cooling water circulation to the absorption chiller; chemical-free water treatment methodology; potential for water reuse in potable applications; and integration with the automated control system.

The system supports high-capacity fast charging through: scalable power generation from 70 kW to 600 kW; integration with 460-volt, 3-phase power distribution; support for multiple charging stations; and load management capabilities for varying demand patterns. In a dual-module configuration, the system is structured to optimize power generation and thermal management. The first module (Module-1) is dedicated to power generation and houses the primary generator set (Genset), power distribution components, and control systems required for managing energy flow and system operation. The second module (Module-2) is specifically designed for waste heat recovery and thermal management, incorporating Yazaki water-fired absorption chillers, a closed-circuit evaporative cooler, circulation pump systems, and advanced thermal management controls to maximize system efficiency.

The system supports high-capacity fast charging through: scalable power generation from 70 kW to 600 kW; integration with 460-volt, 3-phase power distribution; support for multiple charging stations; and load management capabilities for varying demand patterns. While larger installations typically utilize a dual-module configuration to optimize power generation and thermal management, the system may alternatively be implemented in a single-module configuration for applications under 300 kW. In this compact embodiment, the generator set, water-fired absorption chiller, evaporative cooler, and all associated control systems are integrated within a single weatherproof enclosure. This consolidated design maintains full thermal recovery and power generation capabilities while reducing the overall footprint and installation complexity. The single-module configuration features strategic component placement and accessible maintenance points to ensure all critical systems can be easily serviced, with particular attention to providing clear access to the generator, chiller, and control panels. In a dual-module configuration, the system is structured to optimize power generation and thermal management.

To ensure the effective circulation of thermal fluids throughout the system, vertical inline circulating pumps are integrated to facilitate various heat exchange processes.

These pumps are responsible for transporting hot water from the Genset to the absorption chillers, maintaining cooling water circulation between the evaporative cooler and the absorption units, distributing chilled or heated water to the facility systems, and integrating with the system's automated control protocols to regulate performance dynamically.

The security monitoring subsystem is designed to enhance operational oversight and infrastructure protection. This integrated security system includes a 360-degree motion-activated camera, which provides continuous surveillance and real-time threat detection. The remote monitoring capabilities enable operators to oversee system functionality from a remote location, while real-time operational parameter tracking and automated alert protocols ensure immediate response to security concerns and system anomalies.

The remote monitoring system further extends to tracking key operational parameters essential for maintaining system reliability and efficiency. This system continuously monitors unit operational status, detects faults, and generates automated notifications for maintenance and troubleshooting. Additionally, it records fuel consumption metrics, power production data, and thermal efficiency parameters, ensuring precise control over energy usage and performance. Temperature and flow measurements are actively tracked to optimize thermal exchange processes, while maintenance scheduling indicators provide predictive alerts for routine servicing. The system also monitors safety system status, ensuring compliance with operational protocols and mitigating risks associated with system failures.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed:

1. A modular utility system comprising:
    a generator set configured to operate using at least one of natural gas, propane, methane, or hydrogen fuel;
    a water-fired absorption chiller thermally coupled to the generator set and configured to utilize waste heat from the generator set;
    a closed-circuit evaporative cooler operatively connected to the water-fired absorption chiller;
    a security monitoring subsystem including at least one 360-degree camera; and
    a power distribution panel configured to provide electrical power for at least one of building power supply or electric vehicle charging;
    wherein the generator set, water-fired absorption chiller, closed-circuit evaporative cooler, and security monitoring subsystem are integrated within a modular framework configured for transport within a standardized shipping container.

2. The system of claim 1, wherein the generator set is configured to provide electrical power output ranging from 70 kW to 600 kW.

3. The system of claim 1, wherein the water-fired absorption chiller comprises a lithium-bromide and water solution refrigerant system.

4. The system of claim 1, wherein the closed-circuit evaporative cooler is configured to treat wastewater without chemical additives.

5. The system of claim 1, further comprising a remote monitoring system configured to track operational parameters including:
    unit operational status;
    fault detection;
    fuel consumption;
    power production;
    thermal efficiency;
    maintenance scheduling indicators; and
    safety system status.

6. The system of claim 1, wherein the power distribution panel comprises a 460-volt, three-phase power distribution system configured to support multiple electric vehicle charging stations.

7. The system of claim 6, wherein the power distribution system is configured to support up to four 160 kW charging stations simultaneously.

8. A method for deploying a modular utility system comprising:
    installing a first module comprising a generator set and power distribution components;
    installing a second module comprising thermal management components;
    establishing thermal coupling between the first and second modules;
    configuring a remote monitoring system;
    connecting the system to a fuel source selected from natural gas, propane, methane, or hydrogen; and
    configuring automated load management for multiple electric vehicle charging stations;

wherein the first and second modules are configured within standardized shipping container dimensions.

9. The method of claim 8, further comprising scaling system capacity by installing additional generator modules.

10. The method of claim 8, wherein establishing thermal coupling comprises connecting the generator set to a water-fired absorption chiller for waste heat recovery.

11. A facility power management system comprising:
a power generation module including a generator set rated between 70 kW and 600 kW;
a thermal management module including:
a water-fired absorption chiller;
a closed-circuit evaporative cooler;
circulation pumps; and
thermal control systems;
an integrated security and monitoring subsystem; and
a power distribution panel configured to support both building power supply and electric vehicle charging stations;
wherein the system is configured for modular deployment within standardized shipping container dimensions.

12. The system of claim 11, wherein the generator set is configured for operation with hydrogen fuel.

13. The system of claim 11, wherein the thermal management module is configured to provide both heating and cooling capabilities using recovered waste heat.

14. The system of claim 11, wherein the circulation pumps comprise vertical inline pumps configured for multiple heat exchange processes.

15. The system of claim 11, wherein the integrated security and monitoring subsystem comprises:
at least one motion-activated camera;
remote operational parameter monitoring; and
automated alert protocols.

16. The system of claim 11, further comprising a weatherproof, powder-coated steel frame enclosure.

17. The system of claim 11, wherein the water-fired absorption chiller utilizes a lithium-bromide and water solution to eliminate conventional refrigerants.

18. The system of claim 11, wherein the system is configured to maintain partial operational capability during maintenance procedures.

* * * * *